United States Patent
Sharpe et al.

(10) Patent No.: US 11,478,084 B2
(45) Date of Patent: Oct. 25, 2022

(54) SEAT ASSEMBLY AND SYSTEM

(71) Applicant: AMI Industries, Inc.

(72) Inventors: Jason M. Sharpe, Colorado Springs, CO (US); Kyle D. Doughty, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 163 days.

(21) Appl. No.: 16/983,624

(22) Filed: Aug. 3, 2020

(65) Prior Publication Data
US 2022/0031076 A1 Feb. 3, 2022

(51) Int. Cl.
| | |
|---|---|
| *A47C 7/54* | (2006.01) |
| *B64D 11/06* | (2006.01) |
| *B60N 2/75* | (2018.01) |
| *A47C 1/024* | (2006.01) |
| *A47C 3/18* | (2006.01) |
| *B60N 2/90* | (2018.01) |
| *A47C 7/50* | (2006.01) |
| *A47C 7/00* | (2006.01) |
| *B60N 2/06* | (2006.01) |

(Continued)

(52) U.S. Cl.
CPC ............ *A47C 7/541* (2018.08); *A47C 1/0248* (2013.01); *A47C 3/18* (2013.01); *A47C 7/002* (2013.01); *A47C 7/5066* (2018.08); *B60N 2/06* (2013.01); *B60N 2/14* (2013.01); *B60N 2/20* (2013.01); *B60N 2/763* (2018.02); *B60N 2/995* (2018.02); *B64D 11/0639* (2014.12); *B64D 11/0643* (2014.12); *B64D 11/0644* (2014.12); *F16C 1/12* (2013.01); *G05G 1/04* (2013.01)

(58) Field of Classification Search
CPC ........ B60N 2/753; B60N 2/763; A47C 7/541; A47C 7/5066; A47C 1/0248; A47C 3/18; A47C 7/002; B64D 11/0644; B64D 11/0643; B64D 11/0639
See application file for complete search history.

(56) References Cited

U.S. PATENT DOCUMENTS

| | | |
|---|---|---|
| 4,307,913 A | 12/1981 | Spiegelhoff |
| 4,311,338 A | 1/1982 | Moorhouse |

(Continued)

FOREIGN PATENT DOCUMENTS

| | | | |
|---|---|---|---|
| CN | 106073275 A | 11/2016 | |
| DE | 10142833 A1 * | 3/2003 | ............... B60N 2/22 |

(Continued)

OTHER PUBLICATIONS

Extended Search Report for European Application No. 21189459.7 dated Jan. 12, 2022, 6 pages.

*Primary Examiner* — Milton Nelson, Jr.
(74) *Attorney, Agent, or Firm* — Suiter Swantz pc llo (57) ABSTRACT

A system may include a seat assembly. The seat assembly may include a seat base, a seat portion mounted to the seat base, and an armrest assembly configured to be in an up position or a down position. The armrest assembly may include a handle operable by a user to lock or unlock at least one functionality of at least one adjustable seat assembly feature. Operation of the handle may be configured at least to: unlock the at least one functionality of at least one adjustable seat assembly feature while locking the armrest assembly from moving between the up position and the down position.

14 Claims, 10 Drawing Sheets

(51) Int. Cl.
*B60N 2/14* (2006.01)
*B60N 2/20* (2006.01)
*F16C 1/12* (2006.01)
*G05G 1/04* (2006.01)

(56) References Cited

U.S. PATENT DOCUMENTS

| | | |
|---|---|---|
| 4,655,501 A | 4/1987 | Ishigami et al. |
| 4,881,778 A * | 11/1989 | Stephenson ............ B60N 2/753 297/411.39 |
| 8,967,724 B2 | 3/2015 | Battey et al. |
| 9,603,456 B2 | 3/2017 | Lai et al. |
| 9,821,691 B2 | 11/2017 | Brockman |
| 10,414,310 B2 | 9/2019 | Nozaki et al. |
| 2006/0061122 A1* | 3/2006 | Billger .................. B66F 9/0759 296/65.07 |
| 2006/0103212 A1 | 5/2006 | Waligora et al. |
| 2015/0284092 A1* | 10/2015 | Wilkey .............. B64D 11/0643 297/423.29 |
| 2016/0167788 A1 | 6/2016 | Thomaschewski |

FOREIGN PATENT DOCUMENTS

| | | |
|---|---|---|
| DE | 10142833 A1 | 3/2003 |
| DE | 102009031702 A1 | 1/2011 |
| DE | 10052838 B4 | 9/2016 |
| JP | 3463767 B2 | 11/2003 |
| KR | 100401662 B1 | 10/2003 |
| KR | 100456515 B1 | 11/2004 |
| WO | 2014090736 A1 | 6/2014 |

\* cited by examiner

SEAT ASSEMBLY AND SYSTEM

BACKGROUND

Currently, some aircraft seat assemblies have track and swivel functionality and have armrests that can be moved between an up position and a down position. Currently, armrests are often inadvertently raised or lowered when unlocking the track and swivel functionality.

SUMMARY

In one aspect, embodiments of the inventive concepts disclosed herein are directed to a system. The system may include a seat assembly. The seat assembly may include a seat base, a seat portion mounted to the seat base, and an armrest assembly configured to be in an up position or a down position. The armrest assembly may include a handle operable by a user to lock or unlock at least one functionality of at least one adjustable seat assembly feature. Operation of the handle may be configured at least to: unlock the at least one functionality of at least one adjustable seat assembly feature while locking the armrest assembly from moving between the up position and the down position.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including a seat assembly. In some embodiments, the seat assembly may include a seat base, a seat portion, and an armrest having a handle. In some embodiments, operation of the handle may be configured at least to: unlock or lock a functionality of at least one of an adjustable leg rest, an adjustable backrest, a track, and a swivel while locking the armrest assembly from moving between the up position and the down position. For example, with the handle positioned at the front of the armrest assembly, the direction of the force required to move the handle is the same direction as what needs to be applied to the armrest assembly to raise or lower the armrest assembly; some embodiments overcome a problem of the armrest assembly moving between the up and down positions (or vice versa) when the occupant tries to move the handle.

Figure 1:
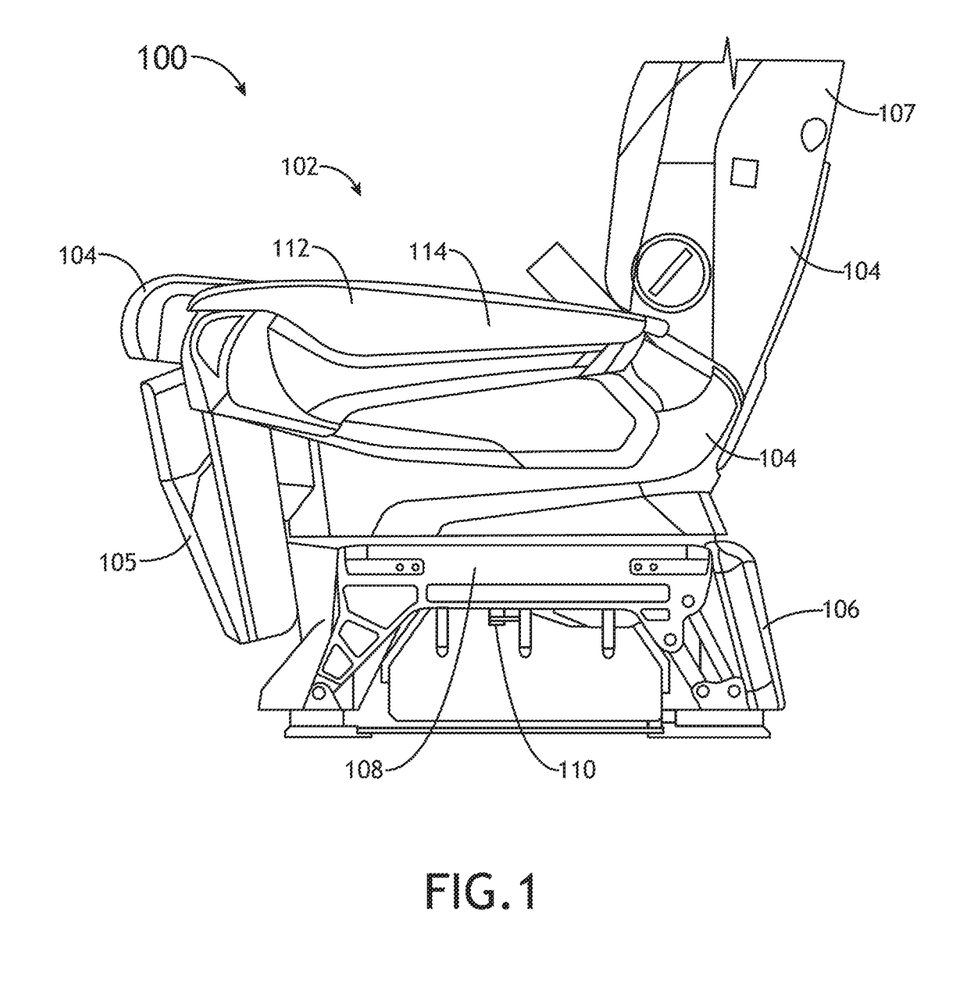
FIG. 1 is a view of an exemplary embodiment of a system including a vehicle including at least one seat assembly according to the inventive concepts disclosed herein.
Figure 2:
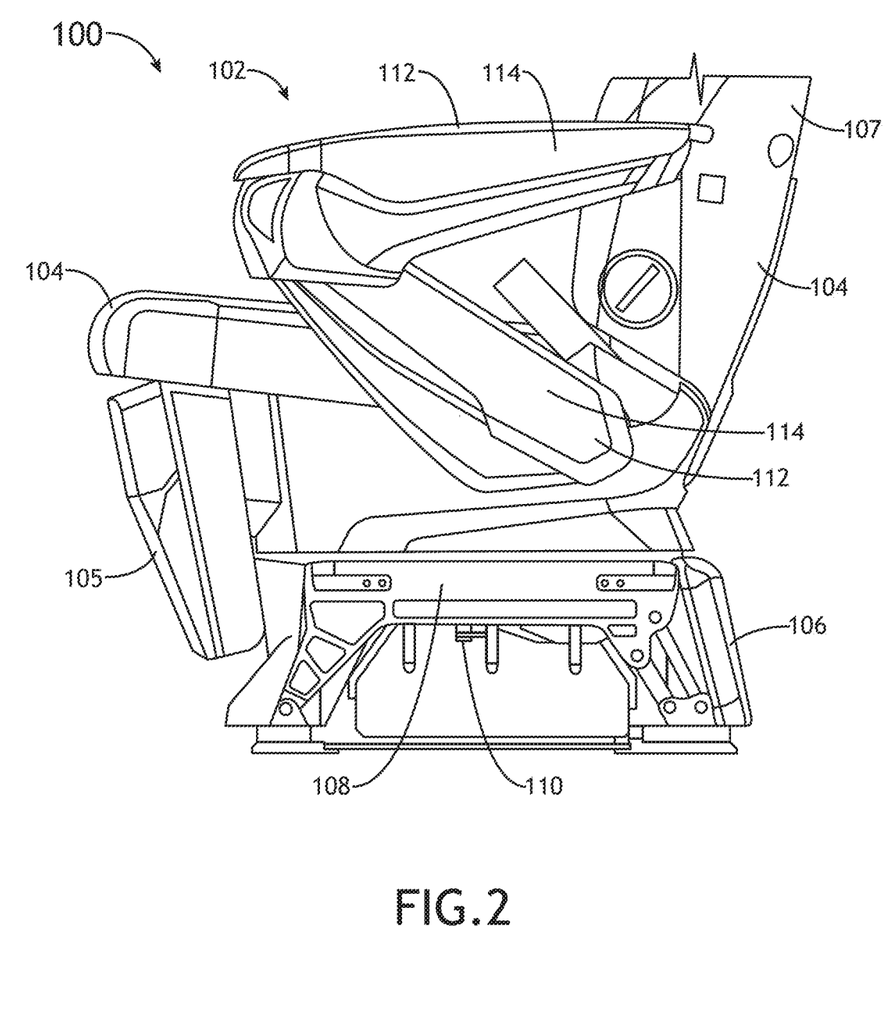
FIG. 2 is a view of the seat assembly of FIG. 1 according to the inventive concepts disclosed herein.

Referring now to FIGS. 1-2, an exemplary embodiment of a system including a vehicle (e.g., aircraft 100, watercraft, automobile, train, etc.) including at least one seat assembly 102 (e.g., an aircraft seat assembly) is depicted according to the inventive concepts. For example, each seat assembly 102 may have a seat portion 104, a seat base 106, and at least one armrest assembly 112. For example, the seat portion 104 may include an adjustable leg rest 105 and/or an adjustable backrest 107. For example, the seat base 106 may be attached to a floor of the aircraft 100. The seat base 106 may include at least one track 108 and/or at least one swivel 110. The seat portion 104 may be mounted (e.g., movably mounted) to the seat base 106. When a functionality of at least one adjustable seat assembly feature (e.g., the adjustable leg rest 105, the adjustable backrest 107, the track 108, and/or the swivel 110) is unlocked, the at least one adjustable seat assembly feature may be adjusted. For example, when a functionality of the adjustable leg rest 105 is unlocked, the adjustable leg rest 105 may be adjusted. For example, when a functionality of the adjustable backrest 107 is unlocked, the adjustable backrest 107 may be adjusted. For example, when a functionality of the track 108 and/or the swivel 110 is unlocked, the seat portion 104 may be moved in a forward or aft direction and/or swiveled. The armrest assembly 112 may be mounted to the seat portion 104. Each armrest assembly 112 may include at least one shroud 114. Each armrest assembly 112 may be configured to be in an up position (as shown in FIG. 2), a down position (as shown in FIG. 1), or somewhere in between. For example, one or both of the at least one armrest assembly 112 may include a handle (e.g., 122, as shown in FIGS. 5-6). The handle (e.g., 122) may be operable by a user to lock or unlock at least one functionality of at least one adjustable seat assembly feature (e.g., the adjustable leg rest 105, the adjustable backrest 107, the track 108, and/or the swivel 110). For example, operation of the handle (e.g., 122) may be configured at least to: unlock at least one functionality of at least one adjustable seat assembly feature (e.g., the adjustable leg rest 105, the adjustable backrest 107, the track 108, and/or the swivel 110) while locking the armrest assembly 112 from moving between the up position and the down position.

Figure 3:
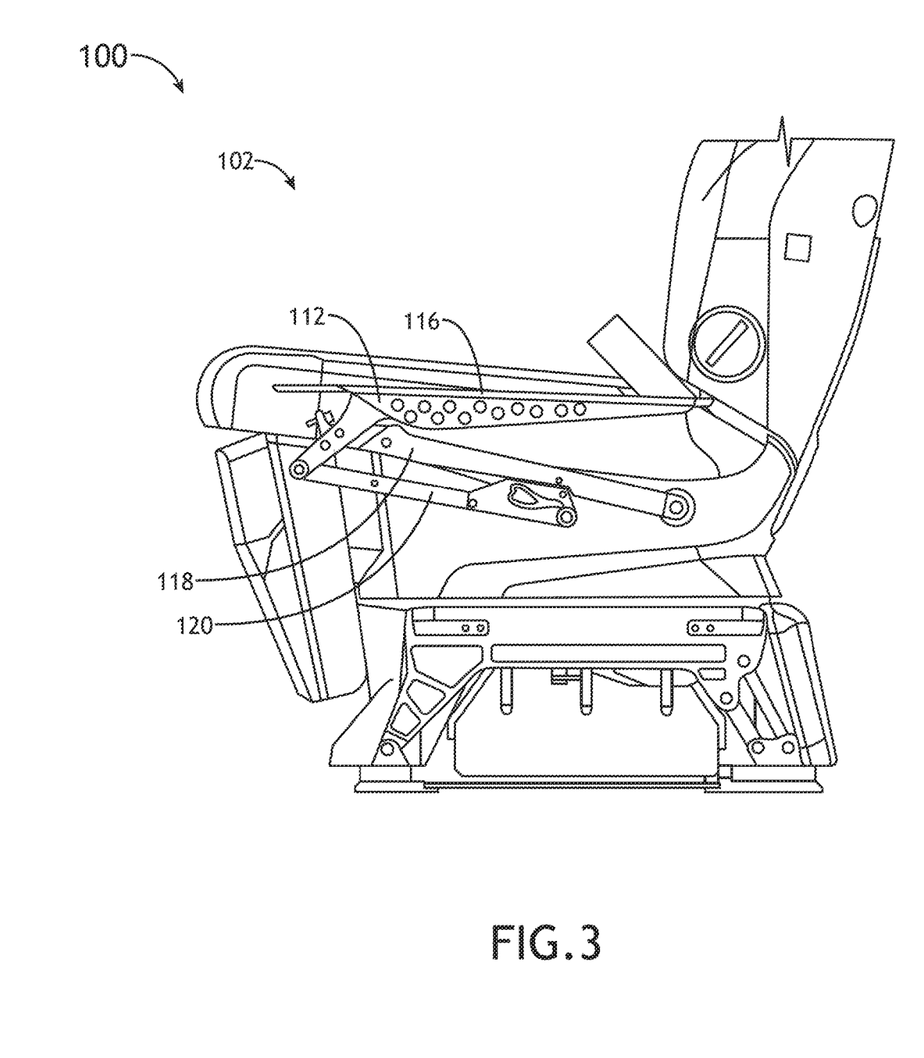
FIG. 3 is a view of the seat assembly of FIG. 1 according to the inventive concepts disclosed herein.
Figure 4:
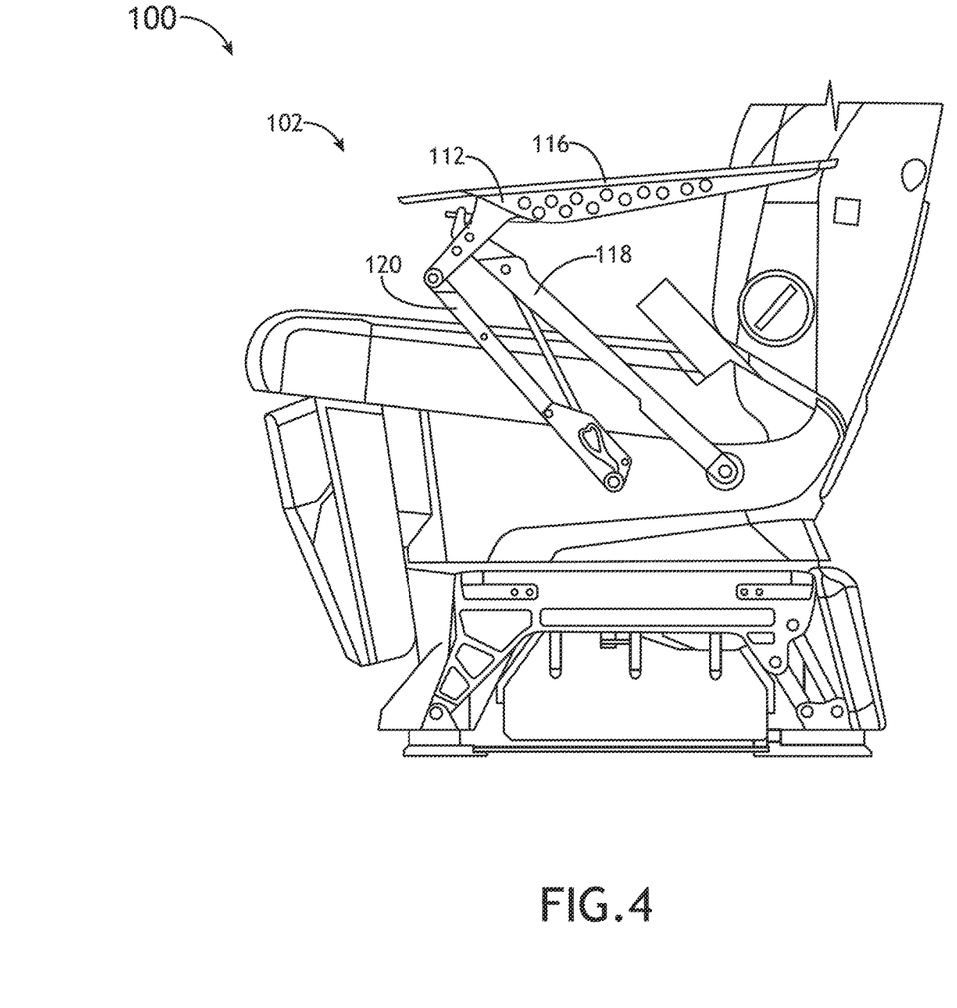
FIG. 4 is a view of the seat assembly of FIG. 1 according to the inventive concepts disclosed herein.

Referring now to FIGS. 3-4, an exemplary embodiment of the at least one seat assembly 102 of FIGS. 1-2 is depicted according to the inventive concepts. FIGS. 3-4 show the seat assembly 102 with the shroud 114 removed from the armrest assembly 112. For example, each armrest assembly 112 may include a plurality of internal components, such as a top link 116, a middle link 118, and a bottom link 120, as well as other components disclosed throughout. Each armrest assembly 112 may be configured to be in an up position (as shown in FIG. 4), a down position (as shown in FIG. 3), or somewhere in between.

Figure 5:
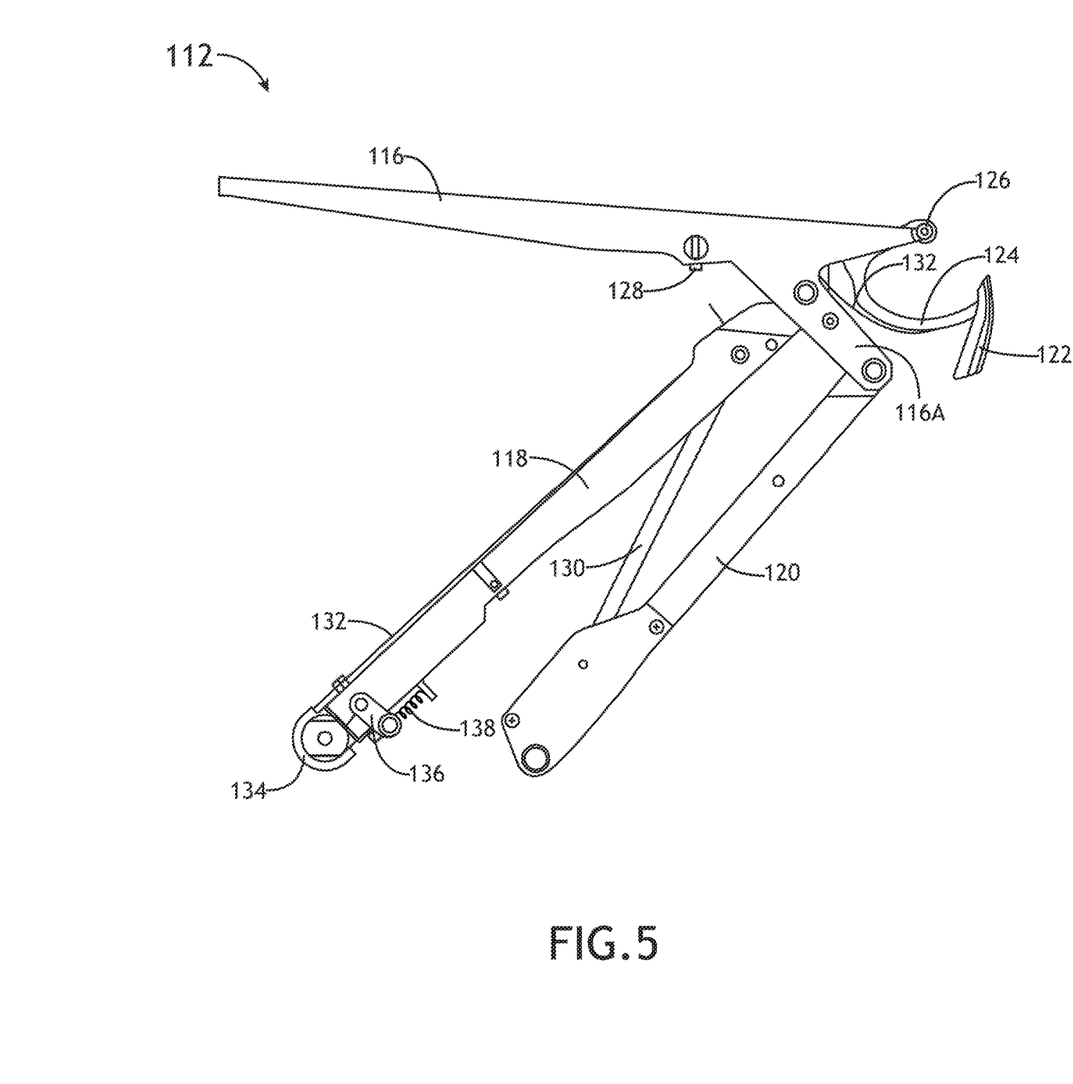
FIG. 5 is a view of an exemplary embodiment of the armrest assembly of FIG. 1.

Referring now to FIG. 5, an exemplary embodiment of the armrest assembly 112 of FIGS. 1-4 is depicted according to the inventive concepts. The armrest assembly 112 may include the at least one shroud 114 (as shown in FIGS. 1-2), at least one top link 116, at least one middle link 118, at least one bottom link 120, at least one handle 122, at least one stop bumper (e.g., an armrest down stop bumper 128), at least one lock rod 130, at least one cable 132, at least one cable guide 134, at least one tensioner 136, and/or at least one spring 138. As shown in FIG. 5, the armrest assembly 112 is in the up position with the handle 122 in a locked position such that at least one functionality of at least one adjustable seat assembly feature (e.g., the adjustable leg rest 105, the adjustable backrest 107, the track 108, and/or the swivel 110) is locked.

The at least one shroud 114 may articulatably fit over the internal components of the armrest assembly 112.

The top link 116 may include a forked portion 116A. The forked portion 116A may be pivotably coupled to the middle link 118 and the bottom link 120. The stop bumper (e.g., an armrest down stop bumper 128) may be attached to the top link 116 and may abut the middle link 118 when the armrest assembly 112 is in the down position.

The middle link 118 may be pivotably coupled to the forked portion 116A of the top link 116 at one end and pivotably coupled to the seat portion 104 at the other end. The lock rod 130 may be pivotably coupled to the middle link 118 near the forked portion 116A. The middle link 118 may include a groove extending lengthwise along at least a portion of the middle link 118 to accommodate the cable 132.

The bottom link 120 may be pivotably coupled to the forked portion 116A of the top link 116 at one end and pivotably coupled to the seat portion 104 at the other end.

The handle 122 may include a handle arm (e.g., a curved handle arm 124). The handle 122 may be pivotably coupled to the top link 116 via a handle pivot point 126. The cable 132 may be coupled at one end to the handle 122. For example, a first range (e.g., 5-10 degrees) of motion of the handle 122 can lock the armrest assembly 112 in a current up or down position, and a second range (e.g., 65-80 degrees) of motion can unlock at least one functionality of at least one adjustable seat assembly feature (e.g., the adjustable leg rest 105, the adjustable backrest 107, the track 108, and/or the swivel 110).

Figure 7:
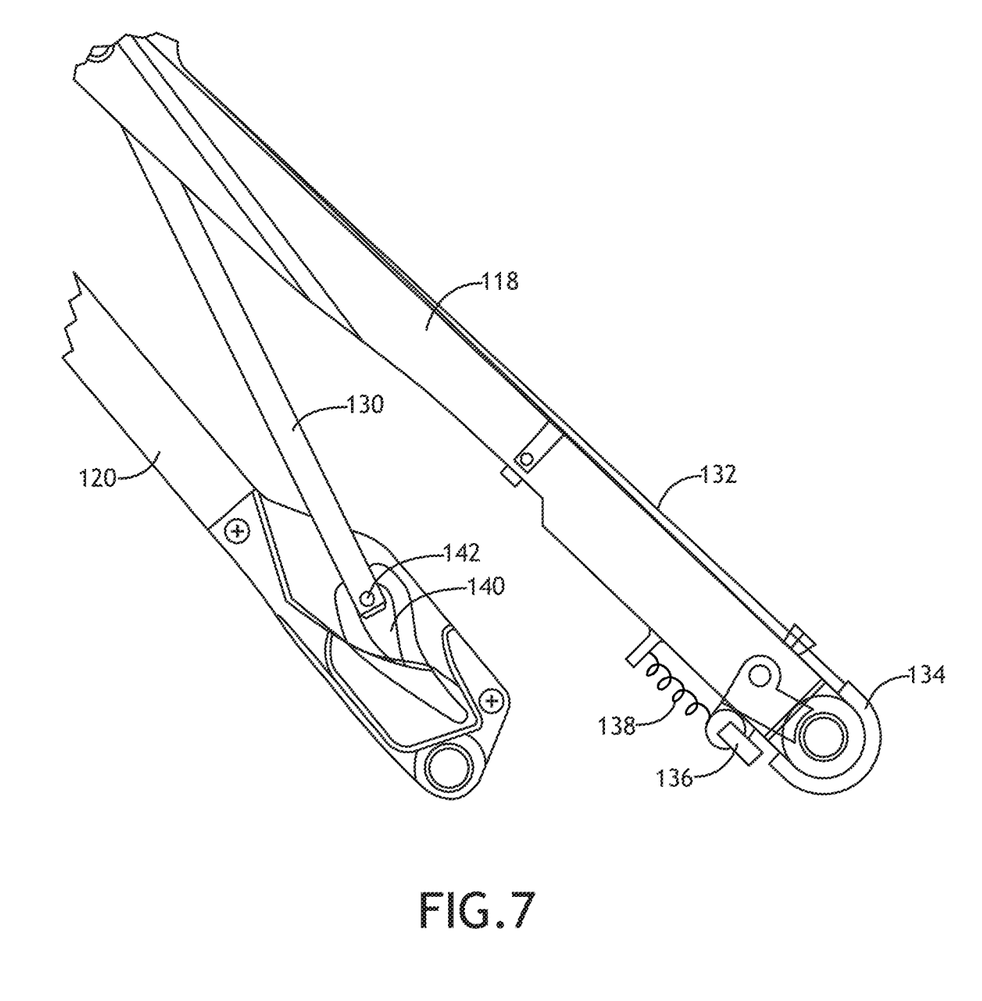
FIG. 7 is a view of an exemplary embodiment of the armrest assembly of FIG. 1.

The lock rod 130 may be pivotably coupled to the middle link 118 at one end. The other end of the lock rod 130 may engage with a cam slot (e.g., 140 as shown in FIG. 7) of the bottom link 120.

The cable 132 may be coupled at one end to the handle 122 and to the tensioner 136 at the other end. The cable 132 may extends lengthwise along the middle link 118, around the cable guide 134, and to the tensioner 136.

The cable guide 134 may be located around an end of the middle link 118 near an attachment point to the seat portion 104. For example, the cable guide may be formed at least in part of acetal and/or any other suitable material.

The tensioner 136 may be pivotably coupled to the middle link 118. The tensioner 136 may be coupled to the cable 132 and the spring 138. The tensioner 136 may be configured to maintain a tension of the cable 132 and to act as an armrest motion lock while unlocking at least one functionality of at least one adjustable seat assembly feature (e.g., the adjustable leg rest 105, the adjustable backrest 107, the track 108, and/or the swivel 110). The tensioner 136 may prevent slack in the cable 132. For example, the tensioner 136 may remove an amount (e.g., 0.339 inches (0.86106 centimeters)) of cable travel between the up and down positions.

The spring 138 may be coupled to the tensioner 136 and the middle link 118.

Figure 6:
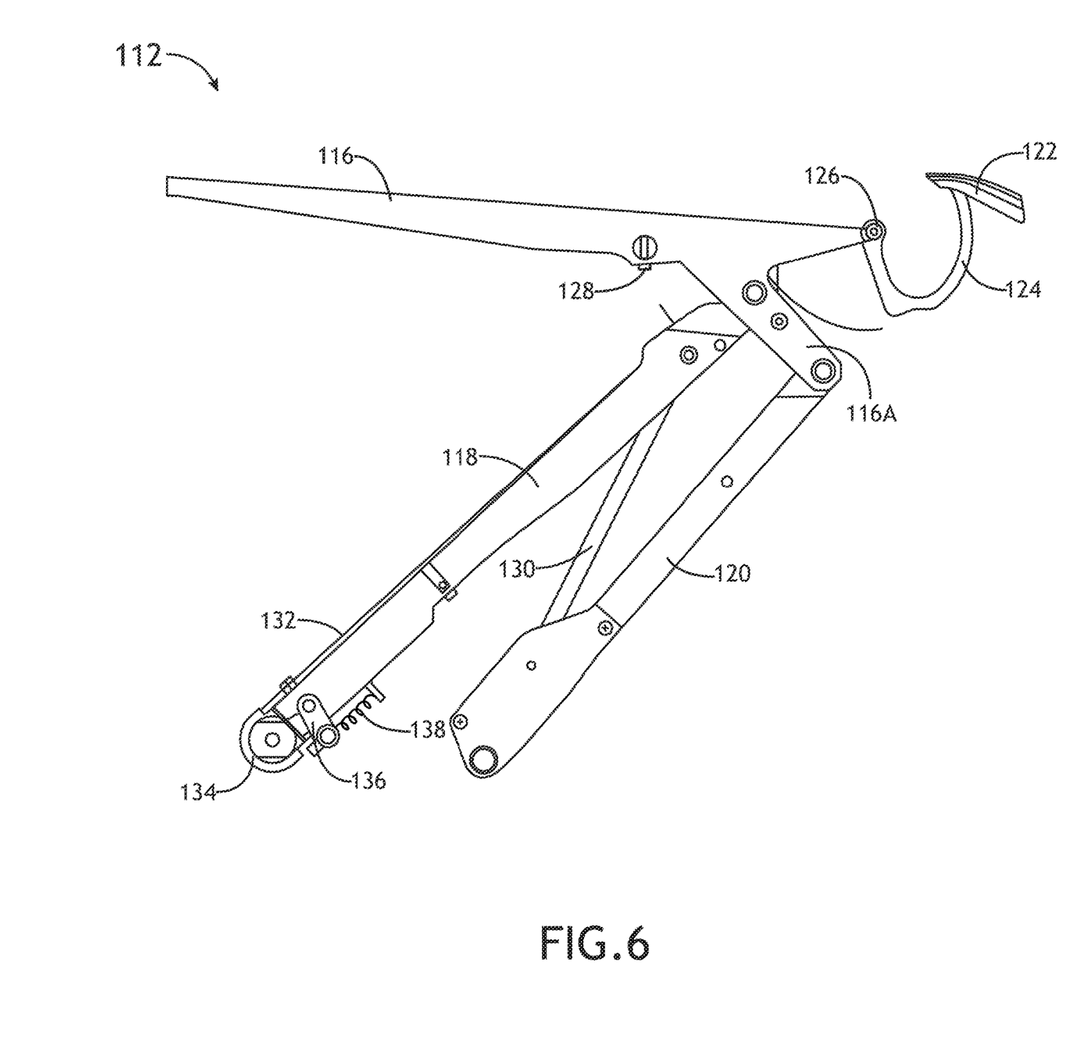
FIG. 6 is a view of an exemplary embodiment of the armrest assembly of FIG. 1.

Referring now to FIG. 6, an exemplary embodiment of the armrest assembly 112 of FIGS. 1-5 is depicted according to the inventive concepts. The armrest assembly 112 may be implemented similarly and function similar to the armrest assembly 112 shown in FIG. 5, except that as shown in FIG. 6, the armrest assembly 112 is in the up position with the handle 122 in an unlocked position such that at least one functionality of at least one adjustable seat assembly feature (e.g., the adjustable leg rest 105, the adjustable backrest 107, the track 108, and/or the swivel 110) is unlocked.

In some embodiments, in order for the occupant to track (e.g., forward, aft, and/or lateral) or swivel the seat portion 104 relative to the seat base 106, the functionality of the track 108 and swivel 110 should be unlocked. To do this, the occupant needs to raise the handle 122 at the front of the armrest assembly 112. This motion pulls on the cable 132, which runs through the armrest assembly 112, into the seat portion 104 and pulls on a lock mechanism (e.g., the tensioner 136 and/or the armrest attachment pin member 144) to unlock the functionality of the track 108 and swivel 110. After moving the seat portion 104 to a desired position, the handle 122 may be released causing the functionality of the track 108 and swivel 110 to lock up again. Some embodiments may lock the armrest assembly 112 in a current up or down position when unlocking the functionality of the track and swivel.

Referring now to FIG. 7, a partial view of an exemplary embodiment of the armrest assembly 112 of FIGS. 1-6 is depicted according to the inventive concepts. As shown in FIG. 7, an end of the lock rod 130 may include a pin 142 that may engage with a cam slot (e.g., a heart-shaped cam slot 140) of the bottom link 120. The pin 142 may be configured to move within the cam slot of the bottom link 120. For example, the cam slot may include two positions for the pin 142 of the lock rod 130 for locking or unlocking the armrest assembly 112 in the up position or the down position.

In some embodiments, the motion of the armrest assembly 112 between the up position and down position may be controlled via the heart-shaped cam slot 140. The pin 142 that may run through the cam slot attached to the lock rod 130, which spans the two parallel links (e.g., the middle link 118 and the bottom link 120) of the armrest assembly 112. The cam slot can be seen at the bottom of the forward-most bottom link 120. To move the armrest assembly 112 from the up position to the down position, the occupant lifts up on the top of the armrest assembly 112, which moves the pin into an "unlock" path of the cam slot. When the armrest assembly 112 is released, the armrest assembly will drop down into the down position. To return to the up position, the occupant would lift on the armrest assembly 112 until the armrest assembly 112 stops moving (e.g., the pin 142 will be at the top of the cam slot at this point) and then releases the armrest assembly 112. When released, the pin 142 slides down to a locked "dip" in the cam slot.

Figure 8:
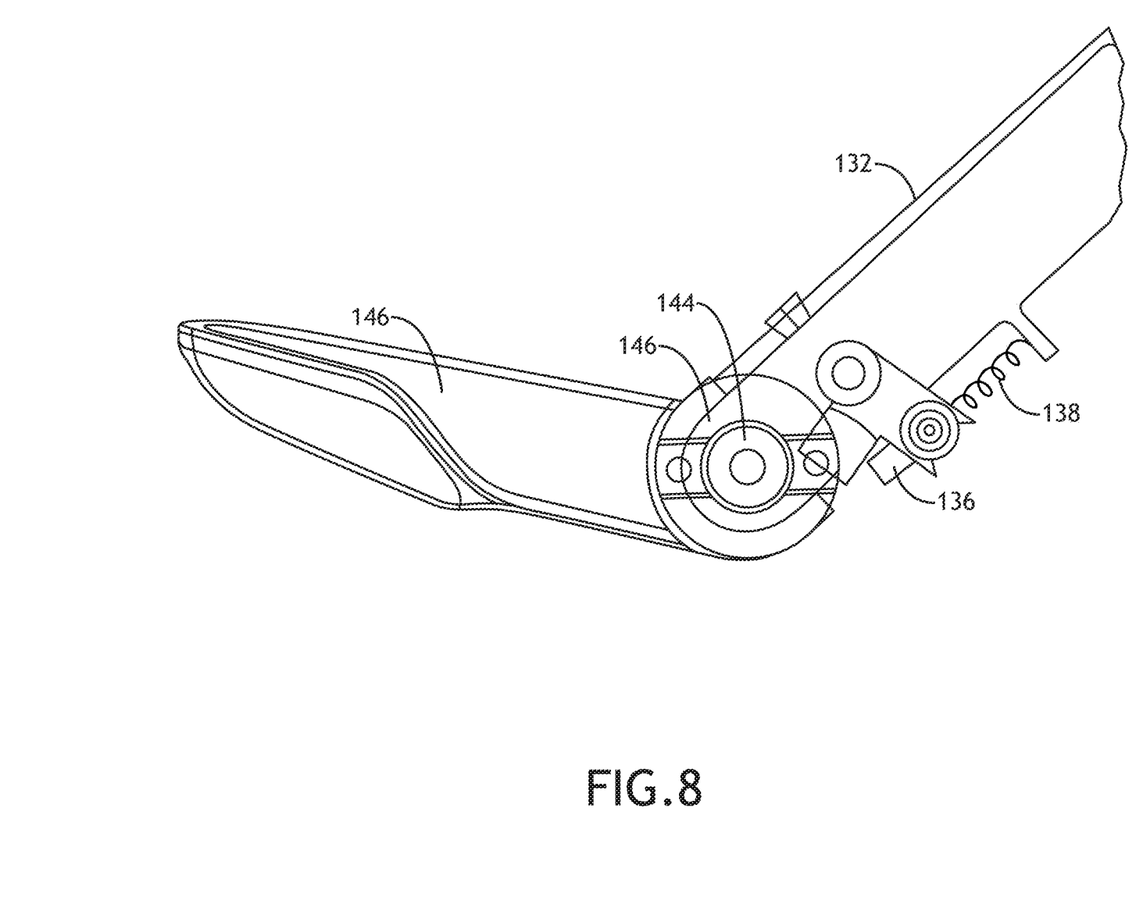
FIG. 8 is a view of an exemplary embodiment of the armrest assembly of FIG. 1.

Referring now to FIG. 8, a partial view of an exemplary embodiment of the armrest assembly 112 of FIGS. 1-7 is depicted according to the inventive concepts. As shown in FIG. 8, the armrest assembly 112 further includes an armrest attachment pin member 144 inserted through a hole at an end (e.g., near the cable guide 134) of the middle link 118. The armrest attachment pin member 144 may extend from the end of the middle link 118. A portion of the tensioner 136 may be configured to engage or disengage with a corresponding portion of the armrest attachment pin member 144 based at least on an amount of an extension or a contraction of the spring 138. The armrest attachment pin member 144 may extend through a portion 146 of the seat portion 104.

Figure 9:
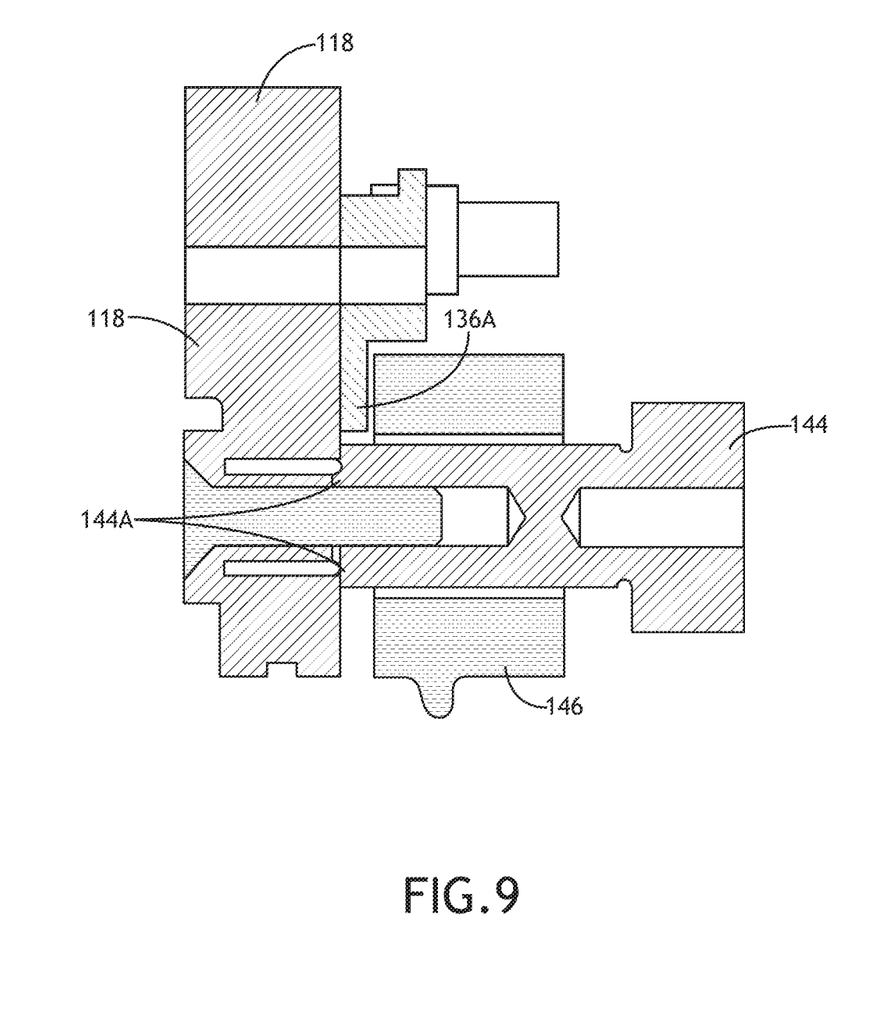
FIG. 9 is a cross-sectional view of an exemplary embodiment of the armrest assembly of FIG. 1.
Figure 10:
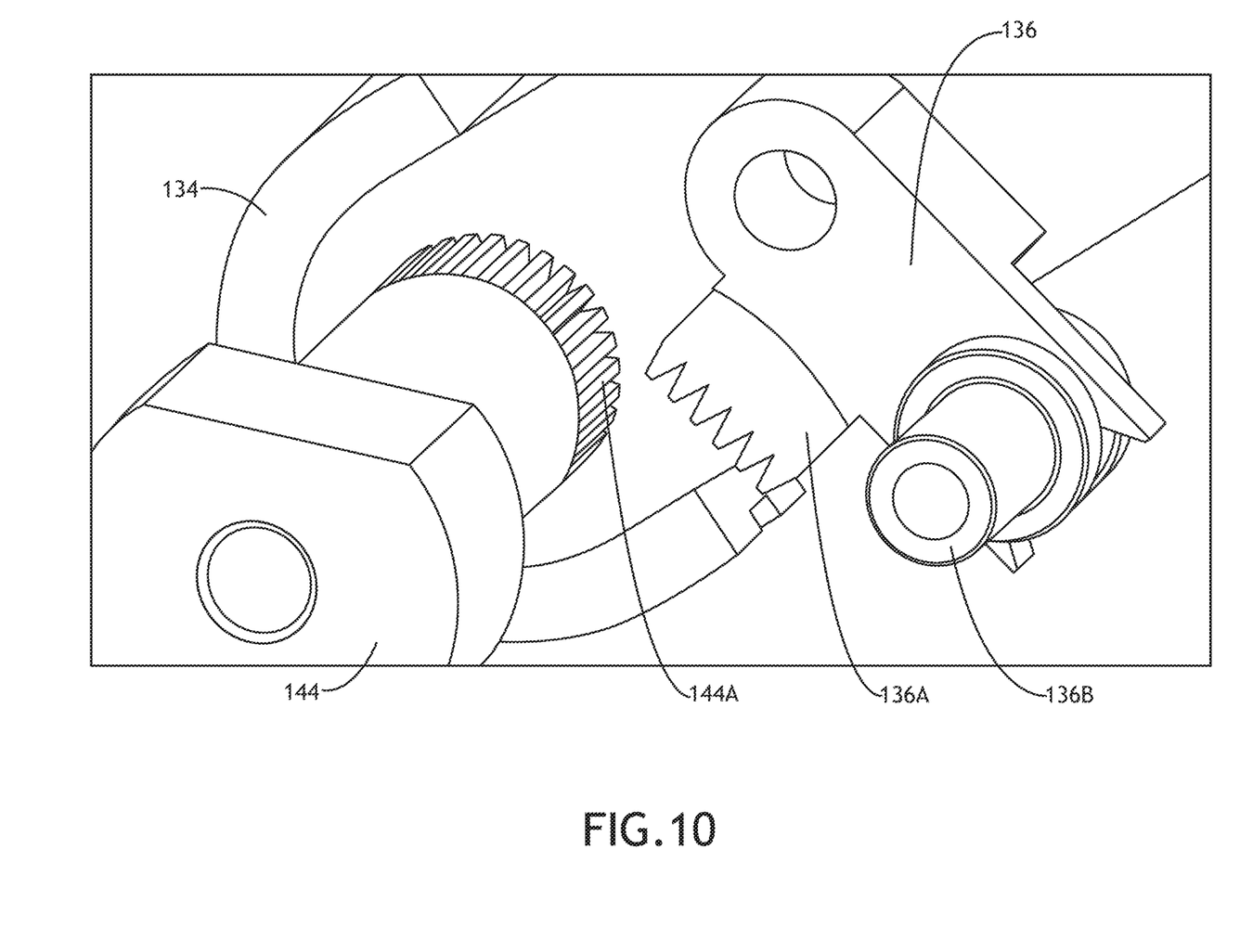
FIG. 10 is a view of an exemplary embodiment of the armrest assembly of FIG. 1.

Referring now to FIG. 9-10, a partial cross-sectional view and a partial isometric view of an exemplary embodiment of the armrest assembly 112 of FIGS. 1-8 are depicted according to the inventive concepts. As shown in FIGS. 9-10, a toothed portion 136A of the tensioner 136 may be configured to engage or disengage with a corresponding toothed portion 144A of the armrest attachment pin member 144 based at least on an amount of an extension or a contraction of the spring 138. The armrest attachment pin member 144 may extend through a portion 146 of the seat portion 104. Additionally, the tensioner 136 may further include a cable attachment member 136B that may be coupled to an end of the cable 132. In some embodiments, a first range (e.g., a first 5-10 degrees) of motion of the handle 122 travel may lock the armrest in the up or down position. The locking mechanism may include the toothed portion 136A of the tensioner 136 engaging or disengaging with the corresponding toothed portion 144A of the armrest attachment pin member 144. The more force that is applied to the handle 122, the more force that is applied to the locking mechanism until the at least one functionality of at least one adjustable seat assembly feature (e.g., the adjustable leg rest 105, the adjustable backrest 107, the track 108, and/or the swivel 110) begins to unlock.

As will be appreciated from the above, embodiments of the inventive concepts disclosed herein may be directed to a system including a seat assembly.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a seat assembly, comprising:
      a seat base;
      a seat portion mounted to the seat base; and
      an armrest assembly configured to be in an up position or a down position, the armrest assembly comprising:

a handle operable by a user to lock or unlock at least one functionality of at least one adjustable seat assembly feature;

a top link;

a middle link;

a bottom link; and a lock rod, the handle pivotably coupled to the top link, the middle link pivotably coupled to the top link and the seat portion, the bottom link pivotably coupled to the top link and the seat portion, the lock rod pivotably coupled to the middle link;

wherein operation of the handle is configured at least to: unlock the at least one functionality of the at least one adjustable seat assembly feature while locking the armrest assembly from moving between the up position and the down position.

2. The system of claim 1, wherein the at least one adjustable seat assembly feature comprises at least one of an adjustable leg rest, an adjustable backrest, a track, or a swivel.

3. The system of claim 1, wherein the seat assembly is an aircraft seat assembly.

4. The system of claim 1, wherein the handle includes a curved arm, wherein the armrest assembly further comprises a cable, wherein the cable is coupled to the handle and extends lengthwise along the middle link.

5. The system of claim 4, wherein the armrest assembly further comprises a tensioner and a spring, the tensioner pivotably coupled to the middle link, the tensioner coupled to the cable and the spring, the spring coupled to the tensioner and the middle link, the tensioner configured to maintain a tension of the cable and to act as an armrest motion lock while unlocking the at least one functionality of the at least one adjustable seat assembly feature.

6. The system of claim 5, wherein the middle link has a cable guide at one end, wherein the cable extends lengthwise along the middle link, around the cable guide, and to the tensioner.

7. The system of claim 6, wherein the tensioner includes a toothed portion.

8. The system of claim 7, wherein the armrest assembly further comprises an armrest attachment pin member extending from the middle link, wherein the armrest attachment pin member includes a corresponding toothed portion, the toothed portion of the tensioner configured to engage or disengage with the corresponding toothed portion based at least on an amount of an extension or a contraction of the spring.

9. The system of claim 8, wherein the tensioner prevents slack in the cable.

10. The system of claim 9, wherein the bottom link includes a cam slot, wherein the lock rod includes a pin configured to move within the cam slot of the bottom link.

11. The system of claim 10, wherein the cam slot includes two positions for the pin of the lock rod for locking or unlocking the armrest assembly in the up position or the down position.

12. The system of claim 11, wherein the cam slot is heart-shaped.

13. The system of claim 12, wherein the armrest assembly further comprises a shroud.

14. The system of claim 13, wherein the at least one adjustable seat assembly feature comprises a track and a swivel, wherein the seat base comprises the track and the swivel, wherein the seat assembly is an aircraft seat assembly.

* * * * *